United States Patent [19]

Coy

[11] Patent Number: 4,638,608

[45] Date of Patent: Jan. 27, 1987

[54] BREAKAWAY STANDARD SUPPORT ASSEMBLY

[75] Inventor: William H. Coy, Lancaster, Pa.

[73] Assignee: Precisionform, Inc., Lancaster, Pa.

[21] Appl. No.: 784,931

[22] Filed: Oct. 7, 1985

[51] Int. Cl.$^4$ ............................................. E04C 1/00
[52] U.S. Cl. ......................................... 52/98; 403/2; 411/432
[58] Field of Search ................. 411/432, 433, 39, 42, 411/427, 63, 18, 65, 66; 404/10; 403/2, 310, 311; 52/98-100

[56] References Cited

U.S. PATENT DOCUMENTS

| | | | |
|---|---|---|---|
| 1,337,642 | 4/1920 | Clark | 403/311 |
| 2,067,271 | 1/1937 | Johnson | 403/310 |
| 2,218,419 | 10/1940 | Chapman | 411/432 |
| 3,355,998 | 12/1967 | Roemisch | 94/1.5 |
| 3,521,413 | 7/1970 | Scott et al. | 52/98 |
| 3,552,698 | 1/1971 | Kinney | 248/158 |
| 3,570,376 | 3/1971 | Overton | 52/98 |
| 3,630,474 | 12/1971 | Minor | 248/158 |
| 3,637,224 | 1/1972 | Strizki | 287/129 |
| 3,846,030 | 11/1974 | Katt | 403/2 |
| 4,007,564 | 2/1977 | Chisholm | 403/2 |
| 4,052,826 | 10/1977 | Chisholm | 52/98 |
| 4,059,360 | 11/1977 | Teissier | 403/2 |
| 4,362,423 | 12/1982 | Miles | 403/311 |
| 4,408,926 | 10/1983 | Werner | 403/310 |

FOREIGN PATENT DOCUMENTS

| | | | |
|---|---|---|---|
| 213157 | 1/1961 | Austria | 403/310 |
| 973677 | 9/1975 | Canada | 403/2 |

*Primary Examiner*—Henry E. Roduazo
*Attorney, Agent, or Firm*—Arnold B. Silverman

[57] ABSTRACT

A breakaway standard support assembly has a base member, a standard member, and a coupler securing the base member to the standard member. The coupler has a coupler body assembly consisting of a plurality of body elements which are secured to each other and retained in such position by band means. The body element which cooperate to define the coupler assembly may be in mechanical interengagement. The coupler is sufficiently strong to support the static loading, normal wind forces and other forces encountered in normal use, but is adapted to fracture upon application of a horizontal impact load as by a vehicle, for example, so as to permit the stanadard to absorb shock and yet be moved out of its fixed position. The strap members may have weakened a portion such as a reduced thickness portion to facilitate fracture at a predetermined load level.

21 Claims, 12 Drawing Figures

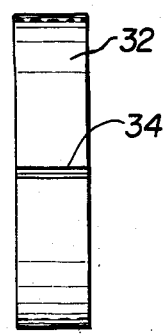
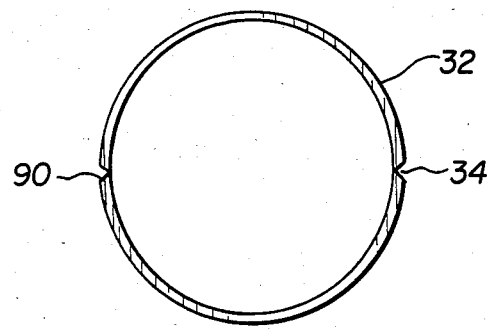
FIG. 4  FIG. 5
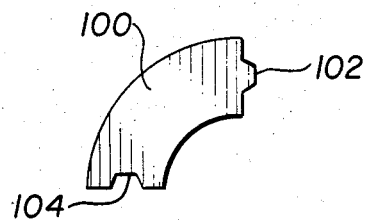
FIG. 6
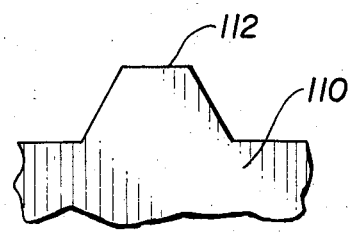
FIG. 7
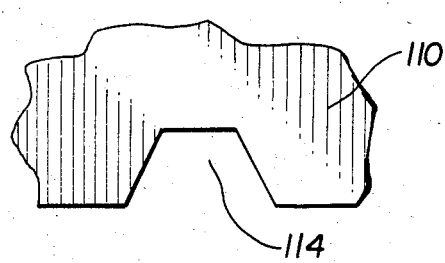
FIG. 8

BREAKAWAY STANDARD SUPPORT ASSEMBLY

BACKGROUND OF THE INVENTION

1. Field of the Invention

The present invention relates to an improved breakaway standard support assembly and to a unique coupler for use in the same.

2. Description of the Prior Art

Numerous serious and fatal vehicle accidents have been caused as a result of vehicles colliding with unyielding road sign standards, light standards and the like.

It has previously been suggested to provide the support structures for such standards with an element which will fracture upon the application of horizontal impact as by a vehicle hitting the standard support at a certain force level. See, generally, U.S. Pat. Nos. 3,355,988; 3,521,413; and U.S. Pat. No. 3,637,244.

It has also been suggested to couple a standard to a base in such a manner that a horizontally imposed impact force will cause separation of the parts without requiring fracture. See. U.S. Pat. No. 3,552,698. U.S. Pat. No. 3,630,474 discloses the use of a plurality of coupler members which have two doors each threaded to receive anchoring or standard securing bolts.

U.S. Pat. Nos. 4,007,564 and 4,052,826 disclose various embodiments of coupler members which have longitudinal grooves which are adapted to fracture upon the application of horizontal impact. The latter patent also discloses a washer which applies additional local forces which are said to facilitate such fracture.

In spite of these disclosures there remains a very real and substantial need for an improved breakaway standard support assembly.

SUMMARY OF THE INVENTION

The present invention has met the above-described need.

The invention contemplates employing a plurality of body elements which cooperate to define a tubular coupler assembly which is secured in assembled condition as a result of tension strap means. The coupler assembly preferably has a threaded interior with an anchor bolt being threadedly secured through one end of the bore and the standard being secured through the other.

The body elements may be mechanically interengaged with each other and cooperating male and female elements may be provided to enhance this cooperation. Upon application of a generally horizontal impact force the strap means will fracture and thereby permit the body elements to fall apart and permit the standard to fall freely.

The strap means may be provided with weakened zones such as notches on the thinned portions, for example, so as to provide better control of the force level which will cause strap fracture.

It is an object of the present invention to provide an improved breakaway standard support assembly which employs a coupling which permits predictable and controllable failure while providing adequate load-bearing properties during normal use.

It is a further object of this invention to provide such an assembly which is economical to manufacture, use and replace.

It is a further object of this invention to provide such an assembly which will be durable under a wide variety of environmental conditions.

These and other objects of the invention will be more fully understood from the following description of the invention on reference to the illustrations appended hereto.

BRIEF DESCRIPTION OF THE DRAWINGS

FIG. 4 is a front elevational view of a form of strap employed in the present invention.

FIG. 5 is a side elevational view of the strap of FIG. 4.

FIG. 6 is a top plan view of a form of body element usable in the present invention.

FIG. 7 is a detail view of the male means of the body element.

FIG. 8 is a detail view of the female portion of the body element.

DESCRIPTION OF THE PREFERRED EMBODIMENT

While the disclosure herein will emphasize use of the invention in connection therewith highway signs and light standards of the type usable adjacent highways or on parking lots or in parking garages or in other locations where vehicles come in close proximity to and may contact the same, it will be appreciated that the invention is applicable to a wide range of similar structures such as parking meter supports, fence posts and the like.

Figure 1:
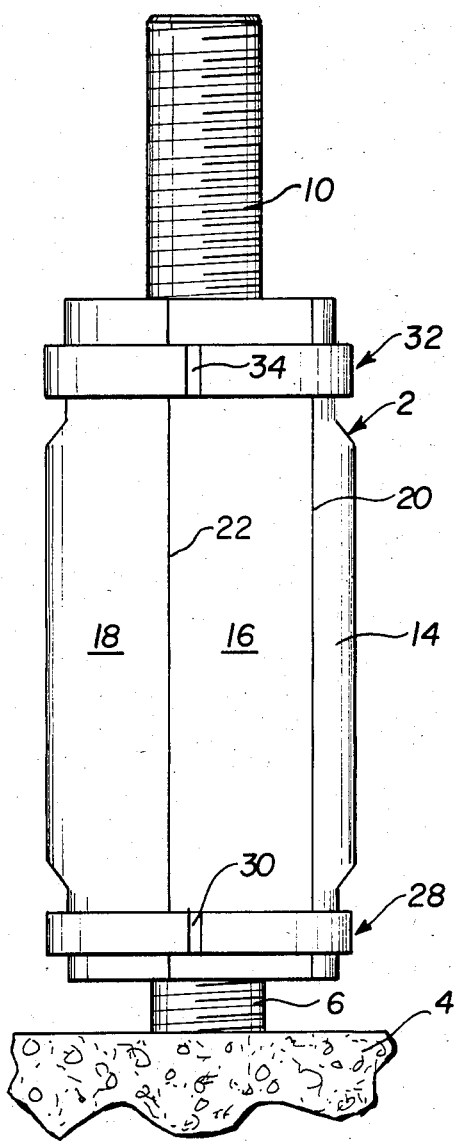
FIG. 1 is a front elevational view of a form of breakaway standard support assembly of the present invention.

Referring now in greater detail to FIG. 1, there is shown a breakaway standard support assembly which consists of a coupler body assembly 2, concrete support pedestal 4 within which is received a threaded anchor bolt 6 which extends into a bore in the coupler assembly 2. Projecting upwardly and also threadedly secured within the bore of the coupler assembly 2 is an externally threaded bolt 10 which is adapted to be employed in securing a standard, either directly or through intermediate connector members (not shown) to the support structure.

In the form shown, a plurality of body elements 14, 16, 18 (and a fourth body element not shown in this view) cooperate to define the coupler assembly 2. It is preferred that the body forming elements be in intimate engagement and mechanically interconnected. Line 20 represents the joint between body element 14 and body element 16 and, similarly, line 22 represents the joint between body element 16 and body element 18.

It will be noted that, in the form shown, the coupler assembly 2 has a generally cylindrical configuration with the upper and lower extremities being of reduced diameter. Circumferential tension bands 28, 32 secure the coupler assembly 2. In the form shown, local weakening zones in bands 28, 32 which take the form of notches 30, 34 are provided so as to enable more precise control over the predetermined horizontal impact load which will fracture the bands 28, 32 and permit the resultant body elements to move away from each other. This permits free movement of the standard support bolt 10 and the standard to which it is attached.

It will be appreciated that, in general, the couplers will provide sufficient load bearing capability, under normal conditions, to bear the load of the overlying standard, normal wind forces and such other forces as will be applied. The coupler is designed, however, to have the tension straps 28, 32 fracture upon the application of a predetermined horizontal impact load. It is also desirable to have sufficient clearance to have a vehicle pass freely over the remaining portions of the breakaway standard support assembly after the collision has occurred. Such is the case in the present invention as fracture of the straps 28, 32 will cause the body elements to be moved thereby leaving solely the upwardly projecting anchor bolts 6 which, according to standards expressed by the Federal Highway Department should project upwardly a maximum of about 4 inches. The Federal Highway Department also prefers to have a system which will fracture under the impact load of a vehicle weighing 1800 pounds or more. This can be accomplished readily by the present invention.

Figure 2:
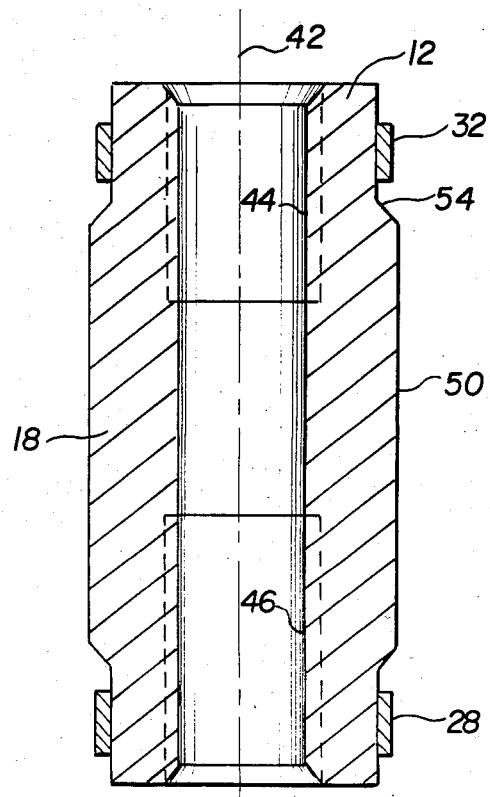
FIG. 2 is a cross-sectional illustration, in elevation, of a form of coupler of the present invention.
Figure 3:
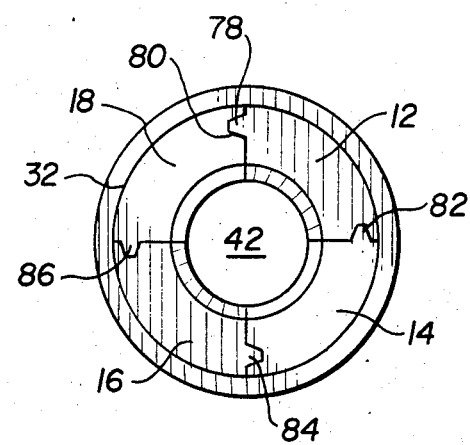
FIG. 3 is a top plan view of the coupler assembly of FIG. 2.
Figure 9:
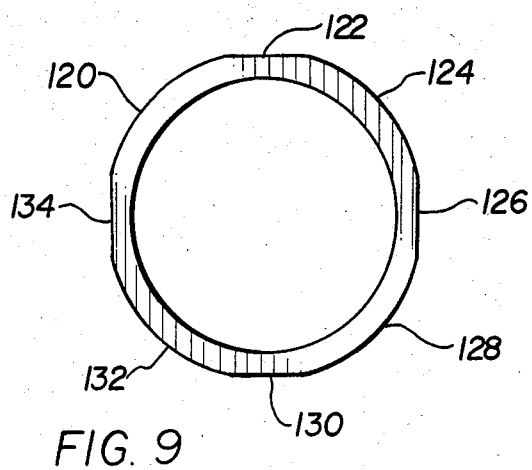
FIG. 9 is a side elevational view of another type of strap means of the present invention.

Referring more specifically to FIGS. 2 and 3, it will be appreciated that the four body elements 12, 14, 16, 18 are cooperating to define a central bore 42. This bore preferably has an internally threaded upper portion 44 and an internally threaded lower portion 46 so as to be threadedly engaged, respectively, by standard supporting bolt 10 and anchor bolt 6. The coupler body preferably has an enlarged centrally located diameter 50 and reduced diameter portions 52, 54 which receive the tension straps 28, 32.

With particular reference to FIG. 3, it will be seen that the body element segments 12, 14, 16, 18 have positive elements to facilitate mechanical interengagement therebetween. The female member of body element 12 receives male member 82 of body element 14. Similarly, male member 78 of body element 12 is received by the female element of body element 18, male element 86 of body element 16 which in turn has its male element 84 received within the female element of body element 14. In this manner, positive mechanical interengagement and integrity of structure is provided. The male and female members are preferably continuous and longitudinally coextensive with the body elements. It will be appreciated, however, that the interengagement is not sufficient to sustain the horizontal vehicle impact without coming apart. As the impact causes the tensile bands 28, 32 to fracture, the coupler will come apart thereby permitting free movement of the standard and supporting bolt 10.

Referring to FIGS. 4 and 5, a preferred form of tensile band will be considered. It will be appreciated that in the form shown two notches which are generally circumferentially opposed position are provided. The notches extend the full width of the bands but preserve at least a portion of the integrity of the material. Upon application of the impact force to the band 32, the notches 34, 90 or one of them will fracture at a predetermined level.

As is shown in FIG. 6, when four body elements are employed, each will occupy generally one-quarter of the circumference of the coupler assembly. Body element 100 has male element 102 and female element 104. FIGS. 7 and 8 show a body element 110 which has a male element 112 which has a frustoconical configuration and is complementary to the female recess 114.

A second embodiment of the invention is illustrated in FIGS. 9 through 12. In this embodiment the band member shown in FIG. 9 which may otherwise have the same dimensions as bands 28, 32 does not have notches. It has a series of arc-like circumferential portions 120, 124, 128, 132 between which are located a series of portions of reduced thickness 122, 126, 130, 134. These latter portions have a substantially flat exterior.

Figure 10:
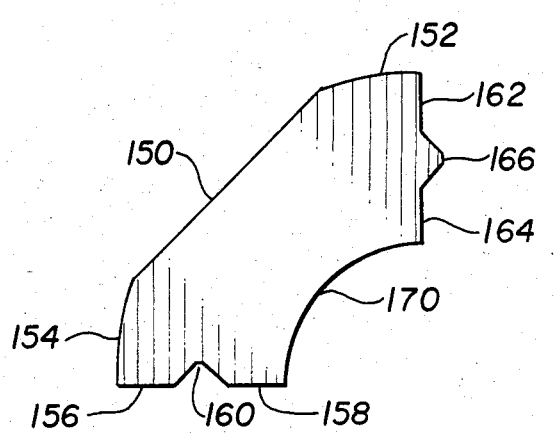
FIG. 10 is a top plan view of a modified form of body element.
Figure 11:
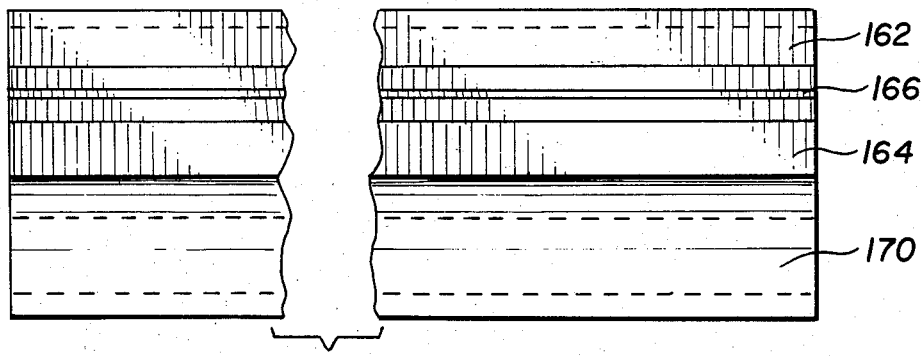
FIG. 11 is a side elevational view of the body element of FIG. 10.

The body element shown in FIGS. 10 and 11 are modified with respect to those of the first embodiment. The body element in lieu of a generally circular external arc has a generally flat sector 150 and curved end sectors 152, 154. A first end of the body element has a pair of generally flat end surfaces 156, 158 and a frusto-conical female recess 160. The second end has a pair of generally flat faces 162, 164 and a frusto-conical male member 166. An interior generally circular arc segment surface 170 is provided.

Figure 12:
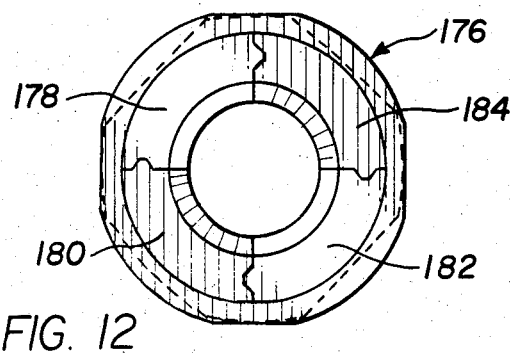
FIG. 12 is a top plan view of a coupler assembly employing the components of FIGS. 9 through 11.

The assembly of the components of FIGS. 9 through 12 is shown in FIG. 12 wherein strap 176 cooperates with body elements 178, 180, 182, 184.

It will be appreciated that both the body elements and the tension bands may be made of any suitable materials such as aluminum, steel, synthetic resinous materials and composite materials. The body elements, for example, might be made of aluminum of the 2024-T41 alloy and the tension band might be made of aluminum in the 7075-T651 alloy with an anodized finish, if desired. In a preferred embodiment, the external diameter of the coupler taken at its maximum dimension may be about 40 to 60 percent of the longitudinal extent of the coupler measured from one end surface to the other. It will be appreciated that unless damage has occurred to the body elements as a result of impact, the device may be reused merely by providing replacement tension bands.

While a generally cylindrical coupler shape has been selected for purposes of illustration, it will be understood that the shape may be any desired shape. For example, it may for certain installations be desired to use another geometric shape or to provide wrench flats on the exterior.

While two specifically preferred types of frangible bands have been illustrated it will be appreciated that other types may be employed. For example, a weakened strap may be provided by scoring the strap material to provide a locally weakened zone or zones.

It will be appreciated, therefore, that the present invention provides a simple, safe, economically efficient and effective breakaway standard support assembly which will facilitate a durable, easy to use and easy to replace system. The system may be so designed that an effective factor of safety with respect to the load of the standard, wind forces and other normal loads may be provided, while controlling fracture of the coupler at a predetermined horizontal impact load so as to reduce the likelihood of death, serious injury or property damage in the event a collision with a vehicle.

Whereas particular embodiments of the invention have been described for purposes of illustration, it will be evident to those skilled in the art that numerous variations of the details may be made without departing from the invention as defined in the appended claims.

I claim:

1. A breakaway standard support assembly comprising
   a base member,
   a standard member,
   a coupler securing said base member to said standard member,
   said coupler having a plurality of body elements and strap means securing said body elements in a coupler body assembly,
   said coupler body assembly having a generally axial bore,
   said strap means being frangible for fracture upon application of a predetermined generally horizontal impact load to said assembly,
   said strap means surrounding and securing said body elements in said coupler body assembly,
   base anchor means extending into one end of said coupler body assembly bore, and
   standard anchor means extending into the other end of said coupler bore assembly bore, whereby said coupler will support the static load of said standard and normal wind loads but will become disassembled upon application of a predetermined generally horizontal impact load adequate to fracture said strap means.

2. The breakaway standard support assembly of claim 1 including
   said body elements being mechanically interengaged with each other.

3. The breakaway standard support assembly of claim 2 including
   said body elements each having an elongated male portion and an elongated female portion, and
   a said male portion of one said body element being in substantially continuous engagement which is substantially coextensive with said body elements with a said female portion of another said body element.

4. A breakaway standard support assembly comprising
   a base member,
   a standard member,
   a coupler securing said base member to said standard member,
   said coupler having a plurality of body elements and strap means securing said body elements in a coupler body assembly,
   said body elements being mechanically interengaged with each other,
   said body elements each having a male portion and a female portion,
   a said male portion of one said body element being in engagement with a said female portion of another said body element,
   said coupler body assembly having a generally axial bore,
   said strap means being frangible and surrounding and securing said body elements in said coupler body assembly,
   said strap means having weakened portions to facilitate fracture at predetermined impact load levels,
   base anchor means extending into one end of said coupler body assembly bore, and
   standard anchor means extending into the other end of said coupler body assembly bore, whereby said coupler will support the static load of said standard and normal wind loads but will become disassembled upon application of a generally horizontal impact load adequate to fracture said strap means.

5. The breakaway standard support assembly of claim 4 including
   said strap means weakened portions having portions of reduced thickness with respect to other portions of said strap means.

6. The breakaway standard support assembly of claim 5 including
   said coupler body assembly having a generally cylindrical exterior shape.

7. The breakaway standard support assembly of claim 6 including
   said strap means having two straps each disposed at or adjacent one end of said coupler assembly.

8. The breakaway standard support assembly of claim 7 including
   said coupler body assembly having a restricted diameter in the region of said strap means.

9. The breakaway standard support assembly of claim 8 including
   said weakened portions of reduced thickness being oriented generally transversely of the circumferential extent of said strap means.

10. The breakaway standard support assembly of claim 9 including
    said reduced thickness portions being notches.

11. The breakaway standard support assembly of claim 9 including
    said coupler body assembly bore having threads,
    a base anchor bolt threadedly secured within said bore, and
    a standard supporting bolt threadedly secured within said bore.

12. The breakaway standard support assembly of claim 11 including
    said coupler body assembly having at least four said body elements.

13. The breakaway standard support assembly of claim 12 including
    said mechanical interengagement between said body elements being such as to cause said coupler body assembly to fall apart upon the application of a generally horizontal impact force in the absence of restraint by said band means.

14. A breakaway standard support coupling comprising
    a plurality of coupler body elements cooperating with each other to define a coupler body assembly,
    strap means for retaining said coupler body assembly
    said strap means being frangible and fracturing upon application of a predetermined force to said assembly, whereby fracture of said strap means will facilitate disassembly of said coupler body assembly,
    said strap means having two straps each disposed at or adjacent at end of said coupler body assembly, and
    said coupler body assembly having a recess of reduced diameter in regions where said strap means are located.

15. The breakaway standard support coupling of claim 14 including
    said body elements being in mechanical interengagement with each other.

16. The breakaway standard support coupling of claim 15 including each said body element having an elongated male member and an elongated female member, and the male member of one said body element being in substantially continuous engagement with the female member of the other which engagement is substantially coextensive with said body elements.

17. The breakaway standard support coupling of claim 16 including said body assembly being generally cylindrical.

18. The breakaway standard support coupling of claim 17 including each said coupler body element having thread segments which cooperate with the thread segments of the other said body elements to define at least one thread within said coupler assembly bore.

19. A breakaway standard support coupling comprising a plurality of coupler body elements cooperating with each other to define a coupler body assembly, said body elements being in mechanical interengagement with each other, each said body element having a male member and a female member, the male member of one said body element being in engagement with the female member of the other, each said coupler body element having thread segments which cooperate with the thread segments of the other said body elements to define at least one thread within said coupler assembly bore, strap means retaining said coupler body assembly, whereby fracture of said strap means will facilitate disassembly of said coupler body assembly, said body assembly being generally cylindrical, said coupler body assembly having a recess of reduced diameter in regions where said strap means are located, said strap means having two straps with each being disposed at or adjacent an end of said coupler body assembly, and said strap means having weakened portions to facilitate strap failure upon application of an impact load to said coupler assembly.

20. The breakaway standard support coupling of claim 19 including said strap means weakened portions having reduced thickness portions.

21. The breakaway standard support assembly of claim 20 including said band means extend generally circumferentially about said coupler body assembly.

* * * * *